United States Patent [19]

Remmers

[11] Patent Number: 5,040,519

[45] Date of Patent: Aug. 20, 1991

[54] SYSTEM TO PREVENT REVERSE ENGINE OPERATION

[75] Inventor: Gregry M. Remmers, Ingleside, Ill.

[73] Assignee: Outboard Marine Corporation, Waukegan, Ill.

[21] Appl. No.: 527,556

[22] Filed: May 23, 1990

Related U.S. Application Data

[63] Continuation-in-part of Ser. No. 315,147, Feb. 24, 1989, Pat. No. 4,957,091, which is a continuation-in-part of Ser. No. 131,457, Dec. 11, 1987, Pat. No. 4,858,585, which is a continuation-in-part of Ser. No. 12,336, Feb. 9, 1987, abandoned.

[51] Int. Cl.$^5$ ............................................. F02P 7/00
[52] U.S. Cl. ................................. 123/602; 123/603; 123/613
[58] Field of Search ........ 123/603, 613, 602, 198 DC, 123/630, 198 D, 631; 315/201 CD; 364/431.05

[56] References Cited

U.S. PATENT DOCUMENTS

| | | | |
|---|---|---|---|
| 3,464,397 | 9/1969 | Burson | 123/406 |
| 3,573,545 | 4/1971 | Warner | 315/201 CD |
| 3,738,339 | 6/1973 | Huntzinger et al. | 123/602 |
| 3,741,185 | 6/1973 | Swift et al. | 123/602 |
| 3,768,451 | 10/1973 | Okamoto | 123/406 |
| 3,779,218 | 12/1973 | Nambu | 123/406 |
| 3,793,833 | 2/1974 | Van Basshuysen | 123/148 |
| 3,795,235 | 5/1974 | Donohue et al. | 123/148 S |
| 3,805,759 | 4/1974 | Fitzner | 123/602 |
| 3,813,877 | 6/1974 | Hunt | 60/285 |
| 3,824,976 | 7/1974 | Katsumata et al. | 123/603 |
| 3,911,889 | 10/1976 | Nagasawa | 123/603 |
| 3,923,023 | 12/1975 | Ito et al. | 123/406 |
| 3,943,896 | 3/1976 | Green et al. | 123/602 |
| 3,952,715 | 4/1976 | Van Siclen, Jr. | 315/209 CD |
| 4,014,309 | 3/1977 | Nagasawa | 123/603 |
| 4,015,564 | 4/1977 | Fitzner | 123/406 |
| 4,096,843 | 6/1978 | Marsee | 123/179 G |
| 4,104,998 | 8/1978 | Fenn | 123/406 |
| 4,108,131 | 8/1978 | Shibukawa | 123/148 CC |
| 4,116,188 | 9/1978 | Nagasawa | 123/603 |
| 4,133,325 | 1/1979 | West | 123/406 |
| 4,170,207 | 10/1979 | Boyama | 123/406 |
| 4,244,336 | 1/1981 | Fitzner | 123/418 |
| 4,276,868 | 7/1981 | Burrows et al. | 123/602 |
| 4,285,315 | 8/1981 | Douaud et al. | 123/425 |
| 4,306,535 | 12/1981 | Fitzner | 123/602 |
| 4,306,536 | 12/1981 | Fitzner | 123/602 |
| 4,309,759 | 1/1982 | Tokuda et al. | 364/431.05 |

(List continued on next page.)

OTHER PUBLICATIONS

1969 Johnson Outboard Motor Service Manual, Chap. 4, pp. 1–3 and 9, (Jan. 1969).

*Primary Examiner*—Raymond A. Nelli
*Attorney, Agent, or Firm*—Welsh & Katz, Ltd.

[57] ABSTRACT

An ignition system for an internal combustion engine, such as an outboard marine engine, which includes an advanced timing schedule, a non-advanced timing schedule, and a circuit for switching between the two schedules or disabling both schedules based upon engine operating conditions. The ignition system includes an opto-electronic time base generator which produces two sets of timing pulses relative to crankshaft position which are non-advanced timing pulses and advanced timing pulses. The time base generator comprises two LED-phototransistor pairs and an encoder disk attached to the crankshaft with slots to interrupt the radiation path between each LED-phototransistor pair. The encoder disk is provided with a synchronizing slot, multiple timing slots associated with the cylinders of the engine, and an direction slot. The direction of the rotation of the engine can be sensed by the spatial relationship between the synchronizing slot and the direction slot. The non-advanced pulses are generated based upon the trailing edge of each timing slot while the advanced pulses are generated based up the leading edge, wherein the width of the timing slots indicate the degree of advancement of the advanced schedule over the non-advanced schedule. Both schedules are inhibited based on predetermined operating parameters of the engine or the detection of a reverse engine operation.

24 Claims, 3 Drawing Sheets

U.S. PATENT DOCUMENTS

| | | | |
|---|---|---|---|
| 4,318,387 | 3/1982 | Fitzner | 123/602 |
| 4,324,215 | 4/1982 | Sieja | 123/602 |
| 4,334,509 | 6/1982 | Nash | 123/414 |
| 4,363,304 | 12/1982 | Fritz et al. | 123/418 |
| 4,404,952 | 9/1983 | Fujimoto et al. | 123/602 |
| 4,436,076 | 3/1984 | Piteo | 123/602 |
| 4,441,478 | 4/1984 | Fujimoto | 123/602 |
| 4,446,841 | 5/1984 | Van Siclen, Jr. | 123/602 |
| 4,452,204 | 6/1984 | Matsubara | 123/417 |
| 4,459,951 | 7/1984 | Tobinaga et al. | 123/198 DC |
| 4,480,624 | 11/1984 | Anderson | 123/602 |
| 4,485,784 | 12/1984 | Fujii et al. | 123/416 |
| 4,492,197 | 1/1985 | Yamamoto et al. | 123/630 |
| 4,498,438 | 2/1985 | Sato | 123/418 |
| 4,499,875 | 2/1985 | Katayama et al. | 123/416 |
| 4,502,441 | 3/1985 | Katayama et al. | 123/416 |
| 4,502,442 | 3/1985 | Takakuwa et al. | 123/417 |
| 4,503,822 | 3/1985 | Kobayashi et al. | 123/416 |
| 4,508,092 | 4/1985 | Kiess et al. | 123/613 |
| 4,516,554 | 5/1985 | Miura et al. | 123/602 |
| 4,519,038 | 5/1985 | Matsui et al. | 364/431.03 |
| 4,520,781 | 6/1985 | Nishida | 123/414 |
| 4,527,522 | 7/1985 | Cerny | 123/416 |
| 4,527,526 | 7/1985 | Adasu | 123/425 |
| 4,562,801 | 1/1986 | Koike | 123/196 S |
| 4,566,425 | 1/1986 | Nitou et al. | 123/603 |
| 4,577,609 | 3/1986 | Donohue | 123/602 |
| 4,633,834 | 1/1987 | Takeuchi et al. | 123/424 |
| 4,646,696 | 3/1987 | Dogadko | 123/602 |
| 4,648,375 | 3/1987 | Andreasson et al. | 123/602 |
| 4,858,585 | 8/1989 | Remmers | 123/602 |

SYSTEM TO PREVENT REVERSE ENGINE OPERATION

CROSS-REFERENCE TO RELATED APPLICATIONS

The present application is a continuation-in-part of U.S. Patent Application entitled "Dual Schedule Ignition System", Ser. No. 315,147, filed on Feb. 24, 1989, now U.S. Pat. No. 4,957,091, by G. M. Remmers, which is also commonly assigned. Remmers, Ser. No. 315,147 is a continuation-in-part of Ser. No. 131,457, filed on 12/11/87, now U.S. Pat. No. 4,858,585 filed Aug. 22, 1989, entitled "Electronically Assisted Engine Starting Means". Ser. No. 131,453 is a continuation-in-part of U.S. patent application Ser. No. 12,336 filed Feb. 9, 1987, now abandoned.

FIELD OF THE INVENTION

The present invention pertains generally to an electronic ignition system for an internal combustion engine, such as an outboard marine engine or the like, and is more particularly directed to a dual schedule ignition system having non-advanced and advanced timing schedules which includes a system to prevent reverse engine operation.

BACKGROUND OF THE INVENTION

Previously, outboard marine engines have often utilized various means for accomplishing easier starting. For example, such engines may engage a "warm-up" lever which manually advances the ignition timing and partially opens the carburetor throttle plate. The function of such arrangement is to increase the idle speed and the air/fuel ratio of the engine when it is started. These conditions allow the engine to start easier and run more smoothly until it has warmed up to its standard operating temperature.

While many other engine ignition systems have utilized various means to selectively advance the ignition timing characteristic during operation, none of these systems has been adapted to selectively change the engine timing characteristic as a function of the temperature of the engine during its warm-up phase, as well as during a predetermined time period regardless of the temperature of the engine, and as a function of the operating speed of the engine, particularly when operated at a relatively high speed.

A multi-variable ignition system for outboard marine engines or the like, which selectively adapts ignition scheduling on this basis is illustrated in U.S. Pat. No. 4,858,585, entitled, "Electronically Assisted Engine Starting Means" by Gregry M. Remmers, which was filed on Dec. 11, 1987, and which is assigned to the assignee of the present invention.

The system of Remmers '585 provides an improved ignition system which utilizes a signal proportional to the speed of the engine and couples such speed signal with other signals representing additional engine operating conditions to selectively modify the ignition timing characteristic of the engine to accomplish the functional operational characteristics of: (1) providing protection against engine damage that may be caused by a runaway speed condition; (2) providing a desirable ignition advance during the warm-up period of the engine; (3) providing a desirable ignition advance during the initial engine start up period, irrespective of the temperature of the engine (i.e., even when the engine is warm as a result of having been previously operated); and (4) providing protection against damage that may be caused by advancing the timing characteristic while operating the engine above a predetermined operating speed.

A dual schedule ignition system including the advantages of Remmers U.S. Pat. No. 4,858,585 and disclosing, inter alia, a novel and improved time base generator and distributor system is illustrated in U.S. Continuation-in-part patent application Ser. No. 315,147, entitled "Dual Schedule Ignition System" by Gregry M. Remmers, which was filed on Feb. 24, 1989 and which is assigned to the same assignee as the present invention.

The disclosures of Remmers (U.S. Pat. No. 4,858,585) and Remmers (Ser. No. 315,147) are hereby expressly incorporated by reference herein.

The time base generator of Remmers (Ser. No. 315,147) is implemented opto-electronically by having an encoder disk with timing features rotated synchronously with the engine crankshaft past an illumination source which is optically coupled to a photo-sensitive element. The timing features are positioned on the disk such that each feature is a predetermined number of degrees of engine rotation in duration. A digital waveform is generated indicating the presence or absence of a particular feature and two pulse trains are derived from each pulse of the waveform, where the first is indicative of the leading edge of the feature and the second is indicative of the trailing edge of the feature.

When the encoder disk is rotated in synchronism with the engine crankshaft, the two trains of pulses form a time base where one pulse train is advanced over the second pulse train by the duration of each timing feature. The timing of the pulse trains relative to actual crankshaft position is varied by movement of the illumination source and photo-sensitive element relative to the encoder disk and is scheduled based upon various engine operating parameters.

The first train of pulses provides an advanced ignition timing schedule while the second train of pulses provides a non-advanced ignition timing schedule. The electrical pulse generator and distributor receives the two pulse trains and selects between the two based upon receiving an advance signal or a non-advanced signal. Alternatively, both schedules are inhibited by an inhibit signal. The selected pulse schedule is distributed to the correct cylinders in the firing sequence of the engine to ignite the engine.

A control circuit generates the advance, non-advanced, and inhibit signals based upon time, engine temperature, and starting condition. Preferably, the advance signal is generated during the starting of the engine and for a short predetermined period thereafter. If the engine is not then operating above a warm up temperature, the advance signal is continued until this condition occurs. Regardless of the warm-up status and time of running, if the engine is being operated in excess of a first engine speed, the non-advanced signal is generated. In addition, if a third engine speed is exceeded, the inhibit signal is generated disabling ignition pulses from both schedules. The inhibit signal is also generated if the engine exceeds a second speed and an overheated engine temperature exists. The first speed is, in general, lower than the second speed, which is lower than the third speed. The overheat temperature is, in general, higher than the warm-up temperature.

While this dual schedule ignition system and other capacitive discharge ignition systems provide a number of advantages, it is possible with such electronic ignition systems for the engine to operate in the reverse direction. By reverse engine operation what is meant is rotation of the engine oppositely to its preferred normal rotation direction, i.e., counterclockwise instead of clockwise for most engines including outboard marine engines. This operation can be detrimental to engine life, durability, and performance because most engines are only timed and designed for forward operation. The water pumps of many engines only operate in the forward direction which could lead to rapid engine damage. Moreover, the gear patterns for the transmissions, gear boxes, propellers, etc. will be reversed which could cause a water craft to back-up when in forward, and could also be detrimental to the mechanical elements of the drive train.

Thus, while the referenced dual ignition schedule system of Remmers is advantageous in timing the engine operation, it would also be of advantage to prevent reverse engine operation with such system.

There have in the past been ignition systems which include means for preventing reverse engine operation. U.S. Pat. No. 3,795,235 by Donohue, et al. comprises a trigger coil which is energized periodically to produce a pulse which times the ignition system for spark generation. A metallic shoe is added in the reverse direction to cause a premature spark so far in advance of the top dead center position of a piston so as to preclude continued engine rotation in the undesired direction.

Also, U.S. Pat. No. 4,276,868 by Burrows, et al. has a charge coil arrangement which produces a charging pulse to the ignition system and a separate trigger pulse. The production of the charging pulse occurs so far in advance of engine top dead center during forward operation that the corresponding pulse occurring during reverse engine rotation is so far after top dead center as to prevent reverse engine operation.

Another ignition system of this type is disclosed in U.S. Pat. No. 4,074,699 by Cavil.

Another ignition system having a magnetic pick-up sensor and a trigger wheel for timing trigger pulses in a capacitive discharge system is disclosed in the Johnson Outboard Motor Service Manual (1969) at FIGS. 4-1, 4-2, and 4-3. An anti-reverse running switch is mechanically activated during reverse engine operation to ground the pick-up sensor.

These systems for preventing reverse engine operation are mostly mechanical or electro-mechanical and relatively incompatible with the opto-electronic type of trigger system of Remmers (Ser. No. 315,147).

SUMMARY OF THE INVENTION

Accordingly, it is an object of the invention to provide an improved electronic ignition system for an internal combustion engine.

Another object of the invention is to provide an improved electronic ignition system which includes a system for preventing reverse engine operation.

Still another object of the invention is to provide an improved ignition system which includes an advanced timing schedule, a non-advanced timing schedule, and a means for switching between the two schedules or disabling both schedules based on the sensing of reverse engine rotation.

Yet another object of the invention is to provide an improved ignition system with a means for sensing reverse engine operation based upon an opto-electronic time base generator.

Accordingly, the invention provides an improved electronic ignition system for internal combustion engines, such as outboard marine engines or the like. The system comprises means for sensing the reverse rotation of the engine and means for preventing engine starting when reverse engine rotation is detected. Preferably, the means for preventing engine starting includes means for inhibiting ignition pulses to the engine as long as the engine rotation is in the reverse direction. By inhibiting ignition pulses, the engine is conveniently prevented from starting and operating in the reverse direction so as not to sustain damage.

In a preferred embodiment, the ignition system includes an opto-electronic time base generator for providing a first train of pulses advanced in time from a second train of pulses. An implementation of the opto-electronic time base generator includes an encoder disk with timing features rotated synchronously with the engine crankshaft past an illumination source which is optically coupled to a photo-sensitive element. The timing features are positioned on the disk such that each feature is a predetermined number of degrees of engine rotation in duration. A digital waveform is generated indicating the presence or absence of a particular feature and the two pulse trains are derived from each pulse of the waveform, where the first is indicative of the leading edge of the feature and the second is indicative of the trailing edge of the feature. An independent synchronizing or reference feature provides a second digital waveform derived from a second illuminating source and photo-sensitive element to determine the relative relationship of the timing features to the crankshaft for each rotation.

An electrical pulse generator and distributor receives the two pulse trains and selects between the two based upon receiving an advance signal or a non-advanced signal based on at least one operating parameter of the engine. Alternatively, both schedules are inhibited by an inhibit signal. The selected pulse schedule is distributed to the correct cylinders in the firing sequence of the engine to ignite the engine. Preferably, a control circuit generates the advance, non-advanced, and inhibit signals based upon time, engine temperature, direction of engine rotation, and engine starting condition.

The system further includes means for sensing reverse engine rotation. The time base generator is provided with an additional directional feature which is fixed relative to the synchronizing feature. In the preferred embodiment, the directional feature is provided as another timing feature which is overlapped with the synchronizing feature to a detectable extent.

Because the synchronizing feature and engine direction feature are overlapped, their pulse generation sequence occurs in one order when the engine is rotated in the forward direction and in the opposite order when the engine is rotated in the reverse direction. Preferably, the synchronization feature is advanced a predetermined number of degrees of forward engine rotation before the engine direction feature.

Direction logic means are included to detect this sequence and generate a direction signal, where the leading edge (either rising or falling) of the synchronization feature will occur before the leading edge (either rising or falling) of the engine direction feature when the engine is rotated in the clockwise (forward) direction. Conversely, when the engine is rotated in the counterclockwise (reverse) direction, the direction logic means will detect the opposite sequence of the leading edge of the engine direction feature occurring before the leading edge of the synchronizing feature. The engine direction logic means will generate a direction signal which will cause an inhibit signal when it senses reverse engine rotation.

In a preferred embodiment, the direction logic means includes a D-type bistable multivibrator. The bistable includes a data input, D, a clock input, CK, and Q and *Q outputs. The bistable is clocked with a pulse representing the leading edge of the digital signal generated by the synchronizing feature. Pulses from the timing features and the direction feature are applied to the D input. If the engine is rotating normally in the forward direction, the clock pulse occurs before the direction feature and the D input is zero. Consequently, the Q output remains in a reset or zero level condition thereby generating a forward direction signal to the ignition system. However, if the engine is rotating in a reverse direction, the D input is a logical one when the clock pulses occur and the Q output will be set thereby generating a reverse direction signal to the ignition system.

The system to prevent reverse engine operation is thus compatible with the advantageous dual schedule ignition system and can be integrated into its circuitry without a significant redesign of that system. The direction logic means uses a minimum of extra components and space which are important considerations in the design of ignition systems for internal combustion engines, particularly those of the outboard marine type.

BRIEF DESCRIPTION OF THE DRAWINGS

These and other objects, features, and aspects of the invention will be better understood and more fully described upon reading the following detailed description in conjunction with the appended drawings wherein.

DETAILED DESCRIPTION OF THE PREFERRED EMBODIMENT

Figure 1:
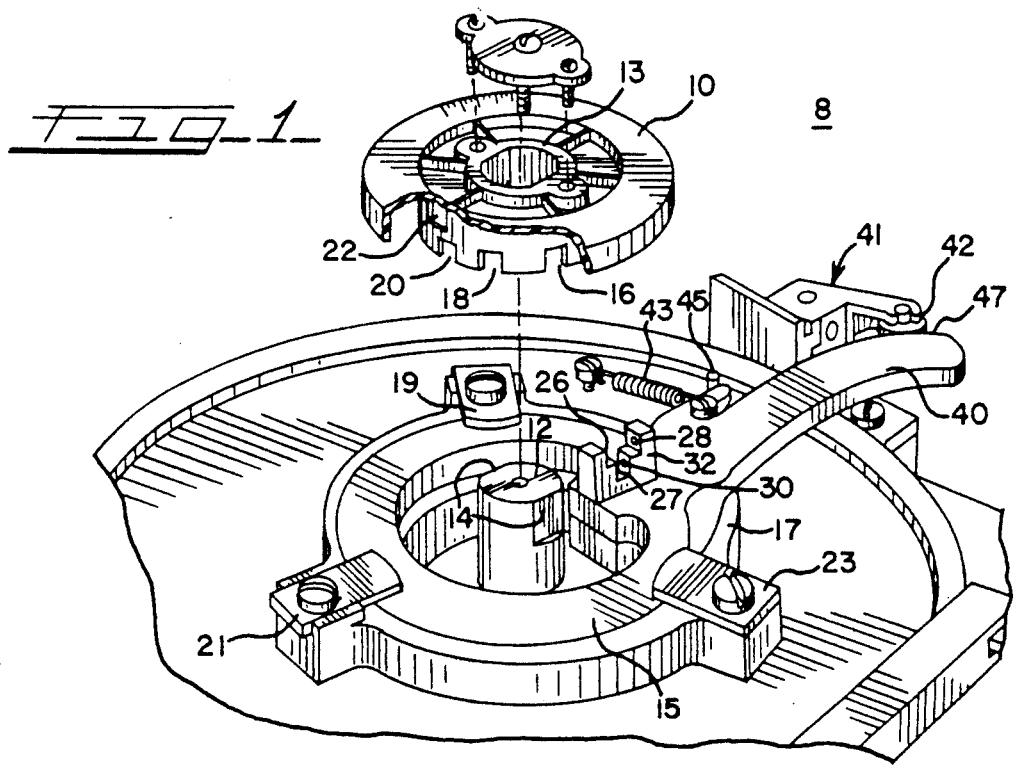
FIG. 1 is a partially-broken, pictorial perspective view of an internal combustion engine of the outboard marine type illustrating a time base generator for an ignition system constructed in accordance with the invention.

A time base generator 8 of the electronic ignition system of the invention is shown to advantage in FIG. 1 where a mechanism for the generation of two timing characteristics or pulse trains is illustrated. The time base generator 8 includes a generally cylindrically shaped encoder disk 10 which is bolted onto a shaft extension 12 of the crankshaft of an internal combustion engine so as to cause the disk to rotate synchronously therewith. The crankshaft extension 12 includes two notches 14 which are received in a reciprocally shaped hub 13 of the encoder disk 10. The notches 14 position the encoder disk 10 and a number of timing features located thereon at a known crankshaft position, i.e., at an angle relative to top dead center of a particular cylinder, for example, cylinder 1. To assist in timing the engine, this reference point 0° can be inscribed on the encoder disk 10 so that it can be aligned with a stationary mark on the engine casing by the common strobe light technique. Rotation of the crankshaft is clockwise when viewed from the top (front) of the engine, as is conventional with many internal combustion engines.

The encoder disk 10 has an encoding portion with several timing features located at spaced positions around its periphery. The timing features in the illustrated implementation are provided as slots 16 and 18, although many other geometric features would suffice. In the preferred embodiment, the number of timing slots is equal to the number of cylinders of the engine and they are equally spaced around the periphery of the encoder disk 10. For a six-cylinder, two cycle engine this means six equally spaced slots at 60° intervals.

Each of the slots 16 and 18 has a width which is a particular angular rotation of the crankshaft, in the preferred implementation, 15°. The encoder disk 10 further includes a synchronizing portion having a synchronizing feature, slot 22, to indicate the relative position of the disk 10 with respect to overall crankshaft position, thus associating each timing slot 16 and 18 with a particular cylinder. In the illustration, slot 22 is placed in advance of cylinder 1, top dead center, and slots 18 and 16 thereby correspond to cylinders 1 and 2, respectively. In addition, a direction feature, slot 20, is located between two cylinder timing features in an overlapping relationship with the synchronizing feature 22. The direction feature 20 is used in conjunction with the synchronizing feature 22 to determine the direction of engine rotation as will be more fully explained hereinafter.

Figure 2:
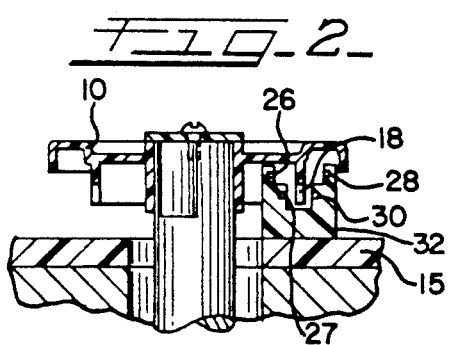
FIG. 2 is a cross-sectional view of a first position of the time base generator illustrated in FIG. 1 taken along section line 2—2 of that figure.
Figure 3:
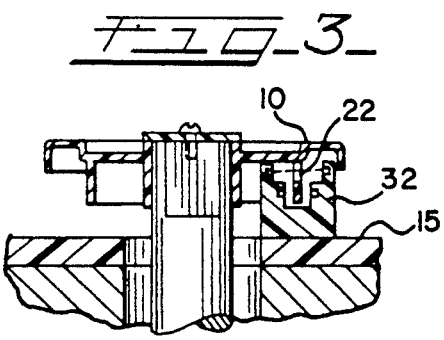
FIG. 3 is a cross-sectional view of a second position of the time base generator illustrated in FIG. 1 taken along section line 3—3 of that figure.

As better shown in FIGS. 2 and 3, the timing features of the encoder disk 10 make and break an optical illumination path between LEDs 26, 27 and two corresponding phototransistors 28 and 30 which are mounted in an optical-coupler block 32. The optical-coupler block 32 is mounted on a timing ring 15 which slidably rotates on the shoulder of a raised boss 17 of the engine. Spring clips 19, 21, 23 retain the ring 15 in the boss 17 without preventing its rotation. An extension arm 40 of the timing ring 15 is used to rotate the ring 15 and, thus the optical-coupler block 32 with respect to the fixed relationship of the encoder disk 10 and the crankshaft.

Normally, the ring 15 is biased to a setable position by spring 43 where it abuts an adjustable stop 45. An ignition advance assembly 41 including a roller 42 can be used to apply force against a cam surface 47 of the arm 40 in order to rotate the optical-coupler block 32 in dependence upon a plurality of engine operating conditions to schedule ignition timing. Such engine operating conditions can be such things as speed, airflow, water or engine temperature, humidity, manifold pressure, altitude, throttle position, etc.

From FIG. 2, it is evident that during the rotation of the encoder disk 10 by the crankshaft, illuminating radiation from the LED 27 to the phototransistor 30 is normally blocked until a slot, for example, the one indicated as 18, rotates between the LED and the phototransistor. At this time, the optical transmission path is open and the phototransistor 30 conducts current producing an electrical signal indicating the presence of the slot. During this time the optical transmission path between LED 26 and the upper phototransistor 28 is blocked by the encoder casing. However, during those times when the slot 22 rotates into a position between the LED 26 and the phototransistor 28, as shown in FIG. 3, the open transmission path causes phototransistor 28 to conduct current and produce an electrical signal indicating the presence of the synchronizing slot 22 at the position of the optical-coupler block 32. Because the synchronizing slot 22 overlaps with the direction slot 20, the phototransistors 28, 30 will both conduct current during this time.

In general, the timing signals generated from the time base generator are shown in FIGS. 4A-4C. The first signal is a SYNC signal (FIG. 4A) from slot 22 which is approximately 10° in duration and occurs once for every 360° of engine crankshaft rotation. The leading edge of the SYNC signal occurs some advancement before top dead center of a particular cylinder, in the illustrated example, cylinder 1. From this leading edge reference point, all other timing pulses and signals for the system can be measured. In general, the SYNC signal is used to reset the distribution sequence of the ignition pulses. The second timing signal, CYL, is a group of pulses forming a digital waveform which is generated from the encoder slots 16, 18, and 20 etc. (shown in FIG. 4B). There is a pulse, CYL1-CYL6, respectively, for each cylinder of the engine. The pulses are 15° of engine rotation in duration and separated by equal angular increments of the crankshaft at 60° intervals. Between the CYL1 and CYL6 pulses and overlapped in time with the SYNC pulse is the direction pulse DIR generated from direction slot 20.

From the pulses of FIG. 4B, two sets of trigger pulses, as shown in FIG. 4C, are generated by the pulse generator and distributor 70. The leading edge of each cylinder or direction pulse, CYL1-CYL6, DIR, is used to generate one train of advanced pulses A, and the trailing edge of each cylinder or direction pulse is used to generate a second train of non-advanced pulses N. The advanced pulse train A is used in an advanced timing schedule and the non-advanced pulse train N is used for a normal timing schedule as will be more fully described hereinafter.

In the preferred embodiment, the non-advanced pulses at idle occur substantially at top dead center of each associated cylinder, while the advanced pulses are advanced over the normal pulses a predetermined increment, 15°. It is seen that the width of the encoder slots 16, 18 determines the predetermined advancement of the advanced schedule over the non-advanced schedule. Further, the position of the optical-coupler block 32 relative to the fixed relationship of the encoder disk 10 and crankshaft determines the variance of timing with respect to engine operating variables and, thus the actual timing schedule.

Figure 4:
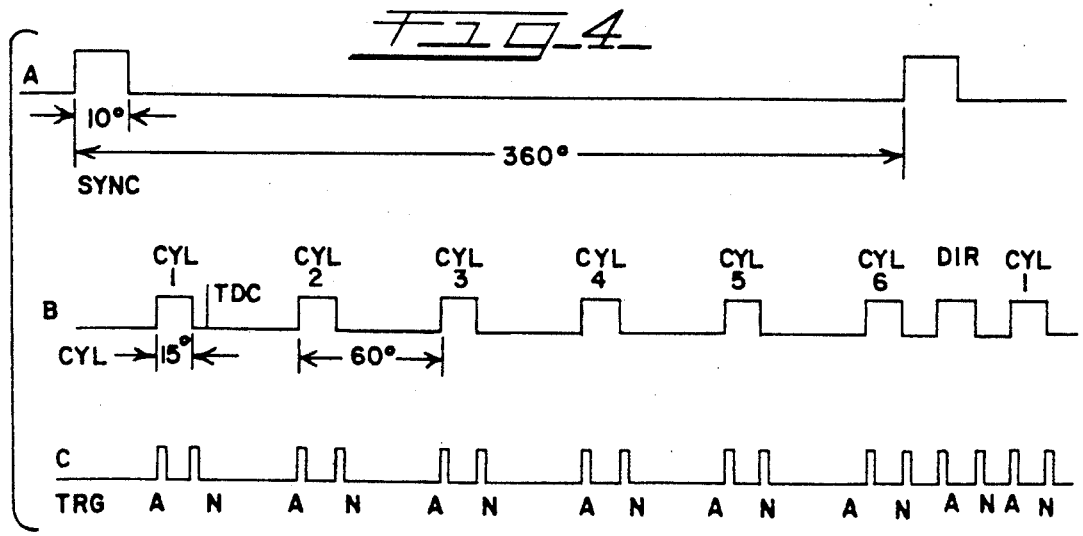
FIGS. 4A–4C are pictorial representations of various timing waveforms output from the time base generator illustrated in FIG. 1 and the pulse generator and distributor illustrated in FIG. 5.
Figure 5:
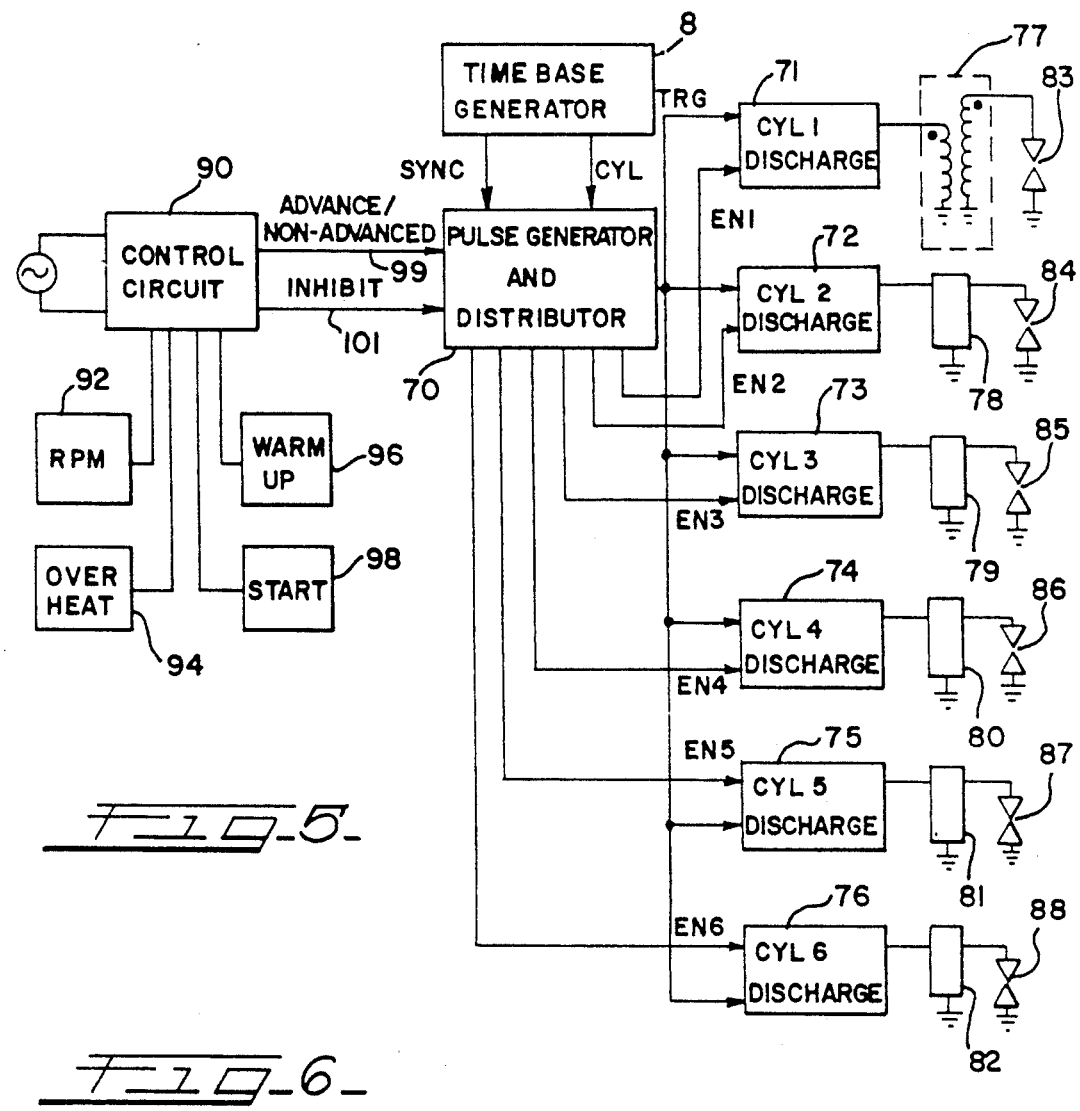
FIG. 5 is system block diagram of an ignition system constructed in accordance with the invention.

An improved ignition system, using the time base generator 8 illustrated in FIGS. 1-4, is more fully shown in the block diagram with reference to FIG. 5. The ignition system includes a pulse generator and distributor 70 which produces trigger pulses TRG to a number of capacitive discharge circuits 71-76, wherein each capacitive discharge circuit is associated with a particular cylinder. When enabled from the pulse generator and distributor 70 by individual enable lines, EN1--EN6, a trigger pulse TRG will cause the capacitive discharge circuits, 71-76, to provide a high current, low voltage pulses of approximately 300V through the primaries of step-up transformers, 77-82, respectively. The step-up transformers, 77-82, step up the voltage of the current pulses from the capacitive discharge circuits into high tension pulses which fire spark plugs, 83-88, respectively, of associated cylinders of the engine. The spark plugs, 83-88, are ignited sequentially in the firing order of the engine by their respective connection in that order relative to the sequence of firings of the capacitive discharge circuits.

The time base generator 8 is shown generating the pulse trains SYNC and CYL to the pulse generator and distributor 70, which are the signals as shown in FIGS. 4A and 4B. The trigger pulses TRG which are derived from these signals by the pulse generator and distributor 70 are those shown in FIG. 4C. They are distributed by generating the enable signals EN1-EN6 based on crankshaft position and the firing order of the engine. Whether the trigger pulses TRG are the advanced schedule A or the non-advanced schedule N, depends upon a control circuit 90.

The control circuit 90 determines, from the engine operating conditions including means for sensing RPM 92, means for sensing an overheat condition 94, means for sensing a warmup condition 96, and means for sensing a starting condition 98, whether the advanced timing schedule, the non-advanced timing schedule, or no timing schedule should be used. This selection information is delivered to the pulse generator and distributor 70 via an ADVANCE/NON-ADVANCED signal on line 99. Alternatively, the control circuit 90 generates an INHIBIT signal on line 101 to completely stop any ignition pulses from being generated to the engine.

Figure 6:
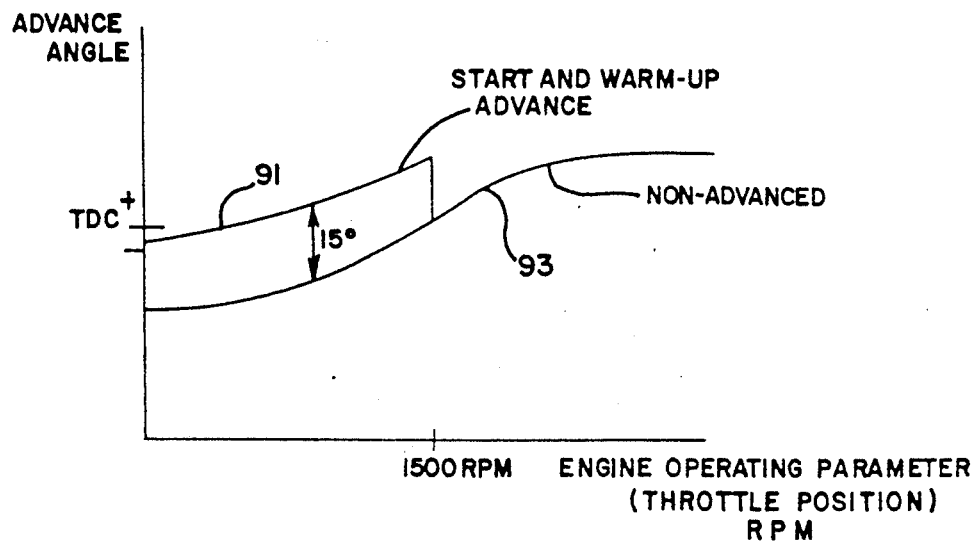
FIG. 6 is a graphical representation of the dual ignition schedules as a function of a plurality of engine operating parameters for the system illustrated in FIG. 5.

FIG. 6 is a graphical representation of the advanced timing schedule 91 and the non-advanced timing schedule 93 illustrating an +advance angle before top dead center (TDC) as a function of an engine operating parameter, or combination of parameters. In the preferred embodiment, the schedules are a similar function of throttle position. While more complex schedules can be used, outboard marine engines advantageously advance ignition timing based on throttle position.

The advanced timing schedule 91 is used during starting and warmup durations, while the non-advanced timing schedule 93 is used at all other times, except in those instances when both ignition schedules are inhibited. It is seen that there is always a +15° advance between the advanced schedule and the non-advanced schedule which is dependent upon the spacing between pulse trains A and N from the time base generator 8. The spacing between the pulses is due to the slot widths of the optical encoder disk 10. The variation in advance angle as a function of engine operating parameters (schedule) is developed by the rotation of the optical-coupler block 32 relative to the fixed position of the optical encoder disk 10 on the crankshaft. The functions or schedules shown in FIG. 6 are generally the same for the advanced timing schedule and the non-advanced timing schedule and monotonically increase with increase in throttle position. However, these can be very complex schedules depending upon the shape of the cam surface which displaces the arm 40 to cause the rotation of the timing ring 15 and the relative movement of the optical-coupler block 32 with respect to the encoder disk 10.

Figure 7:
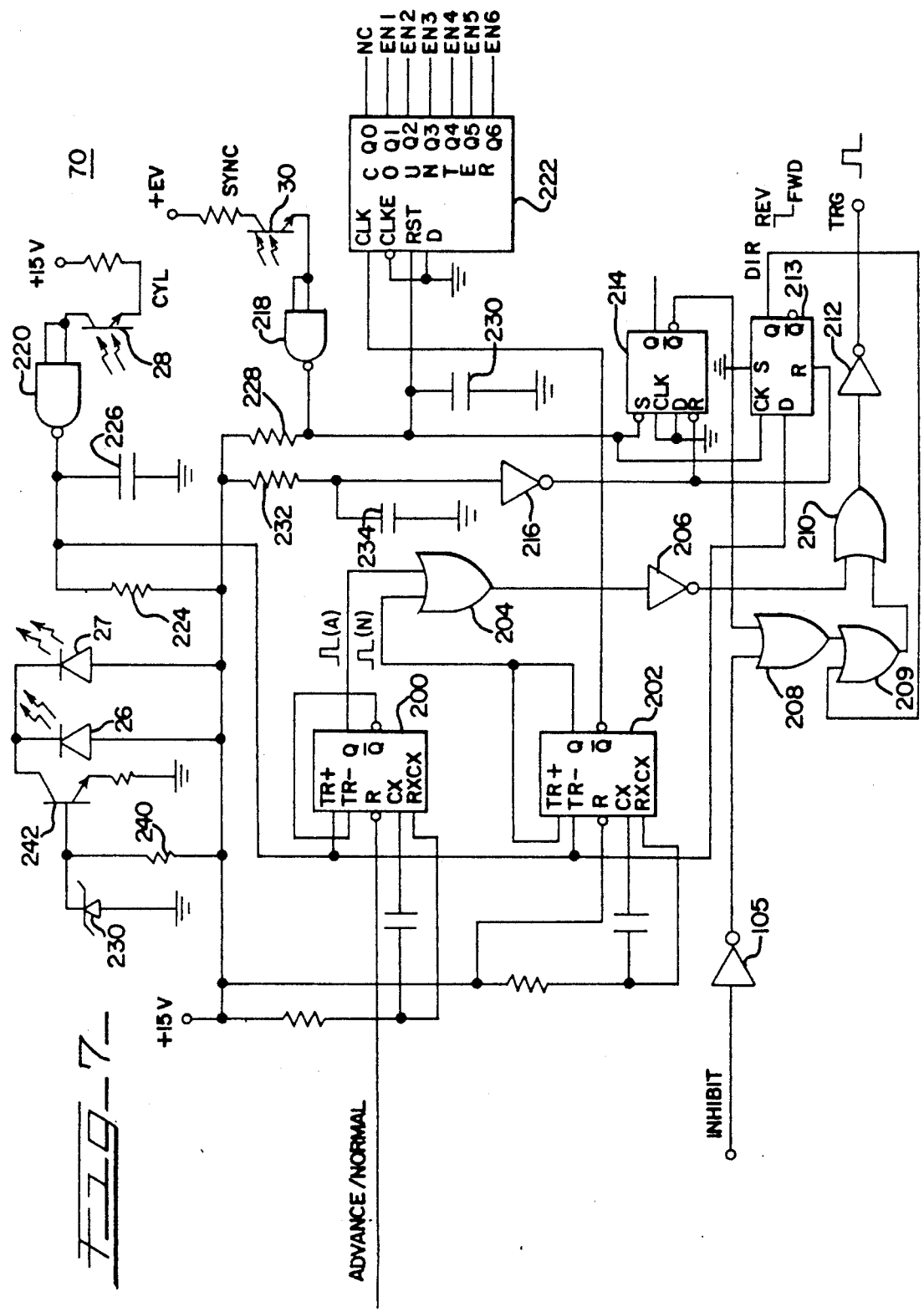
FIG. 7 is a detailed electrical schematic diagram of the pulse generator and distributor circuit illustrated in FIG. 5 including direction logic means.

The control circuit 90 and its operation are more fully disclosed in FIG. 7 of the referenced application, Ser. No. 315,417, by Remmers. Because the present invention uses this circuit in the same manner as that described in the prior application, a duplication of its description here has been omitted for the purpose of clarity.

FIG. 7 illustrates the detailed electrical schematic of the pulse generator and distributor 70. In general, the pulse generator and distributor 70 performs four functions. Initially, it generates the advanced pulse train A and the non-advanced pulse train N from the CYL waveform. Secondly, the circuit selects between the pulse train A and pulse train B, or inhibits both pulse trains, based on the input signals ADVANCE, NON-ADVANCED, and INHIBIT from the control circuit 90. A further function of the pulse generator and distributor 70 is to inhibit both pulse trains based on a detected reverse engine rotation using the SYNC and CYL waveforms. Additionally, the circuit generates the enabling signals, EN1-EN6, based on the SYNC waveform and the CYL waveform to distribute the selected pulse train as the TRG signal to the correct cylinders in the firing order of the engine.

The LEDs 26, 27 are shown as being always powered on by their connection in a conductive path between +15V, the emitter-collector path of NPN transistor 242, a resistor, and ground. The transistor 242 regulates the current flow through LEDs 26, 27 by having a predetermined bias voltage on its base. The bias voltage is generated by the combination of Zener diode 230 and resistor 240 connected between the +15V supply and ground. Phototransistors 28 and 30 generate the previously described signals CYL and SYNC when illuminated by LEDs 26, 27 during rotation of the encoder 10.

The pulse generator and distributor circuit 70 comprises basically two monostable multivibrators 200 and 202 and a synchronous sequential counter 222. Generally, the monostable 200 is configured to be triggered by the positive going edge of a pulse to its TR+ input. Application of an edge transition from a low logic level to a high logic level at input TR+ will produce a positive going pulse from its Q output which becomes the advanced pulse train A. Conversely, the monostable 202 is configured to produce a positive going pulse from its Q output when a negative going edge of a pulse is applied to its TR− input, which results in the non-advanced pulse train N. Both the TR+ input of monostable 200 and the TR− input of monostable 200 are connected to the output of a NAND gate 220 which is configured as an inverter and driven by the CYL signal. The CYL signal is generated by the illumination of phototransistor 28 which is connected across both inputs of the NAND gate 220. The NAND gate 220 has an open collector output connected to the junction of a resistor 224 and a capacitor 226 which inverts the CYL signal, thus providing a positive going transition on the leading edge of the CYL signal and a negative going transition on the trailing edge of the CYL signal. The ADVANCE and NON-ADVANCED signals are a single signal, ADVANCE/NON-ADVANCED, which is applied to the negative true reset terminal R of monostable 200. The ADVANCE signal is the high logic level of the combined signal while the NON-ADVANCED signal is the low logic level.

With this circuit, two pulses are generated for each CYL or DIR signal pulse and form two pulse trains, one based on the leading edges of the CYL or DIR signals from monostable 200 and the other based on the trailing edges of the CYL or DIR signals from monostable 202. If the advanced pulses are selected, the ADVANCE/NON-ADVANCED signal is a high logic level and both pulse trains are transmitted to the cylinders. Because the ignition circuit is a capacitive discharge circuit, the non-advanced pulses which follow the advanced pulses do not perform a retriggering of the ignition system as the ignition capacitance has not yet recharged. If the non-advanced pulses are selected, the ADVANCE/NON-ADVANCED signal is a low logic level which holds monostable 200 reset so that only the non-advanced pulse train is generated.

The first pulse train A and the second pulse train N are combined in a OR gate 204 before being inverted by inverter 206. The output of inverter 206 is fed through OR gate 210 and again inverted in inverter 212 before becoming the trigger signal TRG. The INHIBIT signal is provided through an inverter 105 and OR gate 208 and OR gate 209 to produce a disabling signal at OR gate 210 during its presence. When the INHIBIT signal is a low logic level, a high logic level disables OR gate 210 and both pulse trains.

Another inhibiting signal to OR gate 208 is provided by a D-type bistable multivibrator 214 which has its *Q output connected to one of the inputs of the gate. The reset input R of bistable 214 is connected to the output of inverter 216 whose input is connected to a power on reset resistor-capacitor combination connected between +15V and ground. The set terminal S of the bistable 214 is connected to the SYNC signal at the output of NAND gate 218. In operation, the bistable 214, which is reset on power up, normally disables the trigger pulses TRG until the first SYNC signal occurs. This is to prevent misfiring of the engine when initial engine rotation begins and the ignition system is not yet synchronous with the crankshaft. The capacitor 234 is generally charged up to +15V providing a normally low logic level on the reset input of the bistable 214. This produces a high logic level output from the *Q output and thus disables OR gate 210. When the first SYNC signal occurs, the bistable 214 is set removing the disabling signal from OR gates 208 and 210.

The operation of the direction logic means will now be more fully explained. Another inhibiting signal to OR gate 209 is provided by the Q output of a D-type bistable multivibrator 213. This inhibiting signal is the directional signal DIR which indicates by its logic level whether the engine is rotating in a forward or reverse direction. If the engine is rotating in the forward direction, the DIR signal is a low logic level and the output from OR gate 210 is enabled by a low logic level from OR gate 209. If the engine is rotating in the reverse direction, the DIR signal is a high logic level and pulses are inhibited from passing through OR gate 210 because of the high logic level output of OR gate 209.

The DIR signal is generated from the bistable 213 which has its clock input CK tied to the output of an inverter (NAND gate 218) which is the SYNC signal. The data input D of the bistable 213 is tied to the output of an inverter (NAND gate 220) which is the CYL signal. Normally, the CYL and SYNC pulses do not overlap (see FIG. 4) and the DIR signal remains at a low logic level. Only when the SYNC and CYL signals overlap during a direction pulse DIR is there a possibility of an inhibiting signal. If the engine is rotating in the forward direction, the leading edge of the SYNC signal (as seen in FIG. 4A) will clock the bistable 213. Because the DIR pulse has not yet occurred, a low logic level will be clocked into the Q output of the device and the ignition pulses will not be inhibited. Conversely, if the engine is rotating in the reverse direction, the trailing edge of the SYNC signal will clock the bistable 213. Because the DIR pulse is a high logic level at this time, a high logic level is clocked into the Q output of the device and the ignition pulses will be inhibited.

By inhibiting the ignition pulses to the engine upon detection of reverse engine rotation, the starting and operation of the engine in the reverse direction is prevented. It is important to prevent such operation at this early point to prevent activity which could quickly damage an engine.

The counter 222 generates the enabling signals EN1-- EN6 sequentially from its Q1-Q6 outputs, respectively. The enabling signals EN1-EN6 are generated in sequence and then cycled in the same sequence. The SYNC signal caused by the illumination of phototransistor 30 is used to apply a high logic level to the reset input RST of the counter 222. The SYNC signal is inverted by NAND gate 218, resistor 228 and capacitor 230 in the same manner the CYL signal was inverted and causes the counter 222 to reset. The Q0 output of the counter 222 is left unconnected so that the system sequences past the direction pulse DIR. The end of the DIR pulse thereafter generates the EN1 signal thereby arming the respective capacitive discharge circuit associated therewith. The pulses A or N are then applied to the armed circuit firing the circuit in concert with its respective crankshaft position. After the trigger pulse has been applied, the trailing edge of the next CYL pulse through the *Q output of the monostable 202 clocks the counter 222 by application of the pulses to its CLK input. This advances the counter to the next enabling signal, EN2, and so on in the sequence as the cycle continues.

The capacitive discharge circuits 71-76 and their operation are more fully disclosed in FIG. 9 of the referenced application, Ser. No. 315,417 by Remmers. Because the present invention uses these circuits in the same manner as that described in the prior application, a duplication of their description here has been omitted for the purposes of clarity.

While a preferred embodiment of the invention has been illustrated, it will be obvious to those skilled in the art that various modifications and changes may be made thereto without departing from the spirit and scope of the invention as hereinafter defined in the appended claims.

What is claimed is:

1. An ignition system for an internal combustion engine utilized in powering a boat or other water vehicle, the ignition system being of the type which has an ignition energy storage means, said system comprising:
   means for charging the ignition energy storage means;
   means for discharging the ignition energy storage means;
   means for timing the engine, said timing means including a generally circular encoder disk having an axis of rotation, and rotating synchronously with the crankshaft of the engine and including a plurality of timing sections of a predetermined width which are at fixed locations relative to the crankshaft, said disk having a synchronizing section which is at a fixed location relative to the crankshaft and at least one of said timing sections, and a direction section which is at a fixed location relative to said synchronizing section, said direction section and said synchronizing section being displaced from one another in the axial direction of said disk and being partially overlapping in time when said encoder is rotated;
   means for detecting reverse engine rotation by the detection of the sequence of occurrence at said synchronizing section and said direction section; and,
   means for preventing reverse engine operation caused by said detected reverse engine rotation by inhibiting the discharging or charging of said ignition energy storage means.

2. An ignition system as set forth in claim 1 wherein:
said synchronizing section precedes said direction section when the engine is rotating in a forward direction.

3. An ignition system as set forth in claim 2 wherein:
said direction section precedes said synchronizing section when the engine is rotating in the reverse direction.

4. An ignition system as set forth in claim 1 wherein:
said direction section precedes said synchronizing section when the engine is rotating in a forward direction.

5. An ignition system as set forth in claim 4 wherein:
said synchronizing section precedes said direction section when the engine is rotating in the reverse direction.

6. An ignition system as set forth in claim 2 wherein said means for detecting reverse engine operation includes:
   a D-type bistable multivibrator with a clock input, a data input and a Q output;
   means for generating a synch signal representative of the occurrence of said synchronizing section and for applying said synch signal to the data input of said multivibrator; and
   means for generating a direction signal representative of the occurrence of said direction section for applying said direction signal to the clock input of said multivibrator; and
   said Q output of said multivibrator generating a logic signal which indicates the direction of the crankshaft by its level.

7. An ignition system for an internal combustion engine of the type which has an ignition energy storage means, means for charging the ignition energy storage means, and means for discharging the ignition energy storage means in response to trigger pulses, the system comprising:
   trigger pulse generating means for producing trigger pulses related to crankshaft position including an optoelectronic encoder; and
   means for detecting reverse engine rotation by the sequence of occurrence of at least two reference sections of said encoder where each section is at a fixed location relative to the crankshaft position of the engine and each other; and
   means for inhibiting the generation of said trigger pulses as a function of at least one engine operating condition or for inhibiting said trigger pulses when the engine is rotating in the reverse direction.

8. An ignition system as set forth in claim 7 wherein said encoder having a plurality of timing sections, said trigger pulse generating means further comprises:
   means for generating a first pulse train from the trailing edge of each timing section and for generating a second pulse train from the leading edge of each timing section whereby the pulses of the second pulse train are advanced from the pulses of the first pulse train by a predetermined angular rotation of the crankshaft as determined by the width of each timing section.

9. An ignition system as set forth in claim 8 wherein said trigger pulse generating means further includes:
   means for selecting between the generation of said first and second pulse trains as said trigger pulses or said second pulse train as said trigger pulses based upon at least one operating parameter of the engine, and for outputting the selected pulse trains.

10. An ignition system as set forth in claim 9 wherein:
    said inhibiting means inhibits the output from said means for selecting.

11. An ignition system as set forth in claim 10 wherein said inhibiting means includes:
    A OR gate which outputs said trigger pulses said OR gate having an input connected to the output of said means for selecting and one of more inhibiting inputs.

12. An ignition system as set forth in claim 11 wherein said inhibiting means includes:
    first inhibiting means for generating a first inhibiting signal based on at least one engine operating parameter; and
    one of said one or more inhibiting inputs is connected to said first inhibiting means.

13. An ignition system as set forth in claim 12 wherein said inhibiting means includes:
    second inhibiting means for generating a second inhibiting signal based on the direction of engine rotation; and
    another of said one or more inhibiting input is connected to said second inhibiting means.

14. An ignition system as set forth in claim 13 wherein said inhibiting means includes:
    third inhibiting means for generating a third inhibiting signal based upon initial engine rotation; and
    another of said one or more inhibiting inputs is connected to said third inhibiting means.

15. An ignition system for an internal combustion engine having multiple cylinders driving a crankshaft, each cylinder having at least one spark plug to ignite an air/fuel mixture therein, said ignition system comprising:
    a plurality of cylinder discharge means, each corresponding to one of the cylinders and including ignition capacitor means, means for charging said ignition capacitor means, means for discharging said ignition capacitor means in response to trigger pulses, and step-up transformer means for generating a high tension voltage pulse to the spark plug of the cylinder in response to the discharge of said ignition capacitor means;
    means for generating an advance signal or a non-advanced signal based upon at least one operating parameter of the engine;
    a time base generator including an optoelectronic encoder disk which rotates synchronously with the crankshaft of the engine and includes a plurality of timing sections of a predetermined width which are at fixed locations relative to the crankshaft, at least one synchronizing section which is at a fixed location relative to crankshaft position and relative to at least one of said timing sections, and at least one direction section which is at a fixed location relative to said synchronizing section;
    detector means for detecting the presence or absence of said timing sections, said at least one synchronizing section, and said at least one direction section and for generating digital signals representative thereof;
    trigger pulse generating means for generating a first pulse train from the trailing edge of each timing section represented in said digital signal and for generating a second pulse train from the leading edge of each timing section represented in said digital signal whereby the pulses of said second pulse train are advanced from the pulses of said first pulse train by a predetermined angular rotation of the crankshaft as determined by the width of each timing section;
    said trigger pulse generating means providing said second pulse train to said cylinder discharge means in response to said advance signal being applied thereto and providing said first pulse train to said cylinder discharge means in response to said non-advanced signal being applied thereto; and
    means for generating sequential enabling signals in the firing order of the engine based upon said synchronizing section, each of said enabling signals being applied to corresponding cylinder discharge circuits to discharge said ignition capacitor on the coincidence of a respective said enabling signal and a trigger pulse;
    means for detecting when the engine is rotating in the reverse direction based on the sequential occurrence of said direction section and said synchronization section; and
    means for inhibiting the generation of said trigger pulses as a function of at least one engine operating condition and for inhibiting said trigger pulses when the engine is rotating in the reverse direction.

16. A time base generator for an ignition system of an internal combustion engine having a crankshaft, said time base generator comprising:
    an opto-electronic generally circular encoder disk which rotates about an axis of rotation and synchronously with the crankshaft of the engine and includes a plurality of timing sections of a predetermined width which are at fixed locations relative to the crankshaft, at least one synchronizing section which is at a fixed location relative to the crankshaft and to at least one of said timing sections, said synchronizing section being axially displaced relative to said timing section, and at least one direction section which is at a fixed location relative to said synchronizing section;
    detector means for detecting the presence or absence of said timing sections, said at least one synchronizing section, and said at least one direction section and for generating digital signals representative thereof;
    pulse generating means for generating a first pulse train from the trailing edge of each timing and direction section represented in said digital signal and for generating a second pulse train from the leading edge of each timing and direction section represented in said digital signal whereby the pulses of said second pulse train are advanced from the pulses of said first pulse train by a predetermined angular rotation of the crankshaft determined by the width of each section; and means for generating a reverse engine rotation signal based on the relative sequence of pulses from said synchronizing section and said direction section.

17. A method for detecting engine operating direction comprising:

providing an opto-electronic generally circular encoder disk which rotates about an axis of rotation and synchronously with the crankshaft of the engine and includes a reference section which is at a fixed location relative to crankshaft position and a direction section which is at a fixed location relative to said reference section, wherein said reference section is axially displaced relative to said direction section, such that at least one part of said reference section occurs at a different angular crankshaft position than at least one part of said direction section;

detecting the occurrence of said at least one part of said reference section and the occurrence of said at least one part of said direction section; and determining the direction of engine operation by the sequence of the occurrence of said reference and direction sections.

18. A method as set forth in claim 17 wherein said step of detecting includes:

detecting the occurrence of said at least one part of said reference section by said opto-electronic detector which produces a reference logic signal with a level change at the occurrence of said part.

19. A method as set forth in claim 18 wherein said step of detecting includes:

detecting the occurrence of said at least one part of said direction section by an opto-electronic detector which produces a direction logic signal with a level change at the occurrence of said part.

20. A method as set forth in claim 19 wherein said step of detecting includes:

producing said reference logic signal as a logic signal of predetermined duration with a leading edge and a trailing edge.

21. A method as set forth in claim 20 wherein said step of detecting includes:

producing said direction signal as a logic signal of a predetermined duration with a leading edge and a trailing edge.

22. A method as set forth in claim 21 wherein said step of determining includes:

generating a forward engine operation signal when the leading edge of said reference signal occurs before the leading edge of said direction signal.

23. A method as set forth in claim 22 wherein said step of determining includes:

generating a reverse engine operation signal when the trailing edge of said direction signal occurs before the trailing edge of said reference signal.

24. A method as set forth in claim 23 wherein said step of determining further includes:

providing a D-type bistable multivibrator with a clock input, or data input, and a Q output;

applying said reference signal to the clock input of the D-type bistable multivibrator;

applying said direction signal to the data input of said multivibrator; and generating said forward and reverse engine operation signals as the different logic levels of the Q output of said multivibrator.

* * * * *